(12) United States Patent
Potdar et al.

(10) Patent No.: US 12,463,572 B2
(45) Date of Patent: Nov. 4, 2025

(54) MOTOR BUS SWITCHING

(71) Applicant: EATON INTELLIGENT POWER LIMITED, Dublin (IE)

(72) Inventors: Girish Potdar, Pune (IN); Darshan Harish Bhatt, Amravati (IN)

(73) Assignee: Eaton Intelligent Power Limited, Dublin (IE)

( * ) Notice: Subject to any disclaimer, the term of this patent is extended or adjusted under 35 U.S.C. 154(b) by 228 days.

(21) Appl. No.: 18/486,692

(22) Filed: Oct. 13, 2023

(65) Prior Publication Data

US 2024/0128909 A1    Apr. 18, 2024

(30) Foreign Application Priority Data

Oct. 14, 2022   (IN) .............................. 202211058716

(51) Int. Cl.
*H02P 23/10* (2006.01)
*H02P 27/08* (2006.01)

(52) U.S. Cl.
CPC .............. *H02P 23/10* (2013.01); *H02P 27/08* (2013.01)

(58) Field of Classification Search
CPC ...... H02M 7/5387; H02M 1/322; H02M 1/10; H02P 2101/30; H02P 2101/45; H02P 25/03; H02P 25/062; H02P 27/06; H02P 27/08; H02P 23/10; B64C 3/00; B64C 2003/142; B64C 3/44; B64C 3/48; B64C 9/20; B60L 2210/30; B60L 58/18; B60L 2210/10; B60L 2210/40; B60L 53/60; B60L 58/12;

(Continued)

(56) References Cited

U.S. PATENT DOCUMENTS

| | | |
|---|---|---|
| 7,048,234 B2 | 5/2006 | Recksiek et al. |
| 8,498,344 B2 | 7/2013 | Wilson et al. |
| | (Continued) | |

FOREIGN PATENT DOCUMENTS

| | | |
|---|---|---|
| CN | 111439370 A | 7/2020 |
| CN | 111439390 A | 7/2020 |
| | (Continued) | |

OTHER PUBLICATIONS

Extended European Search Report for Application No. 23203641.8 mailed Mar. 18, 2024.

(Continued)

*Primary Examiner* — Antony M Paul
(74) *Attorney, Agent, or Firm* — Merchant & Gould P.C.

(57) ABSTRACT

A motor system includes a motor, first and second power rails connected to a DC voltage input terminal, and a DC bus capacitor connected between the first and second power rails. An inverter circuit has a first inverter leg, a second inverter leg and a third inverter leg, each of which includes first and second power switches connected in series between the first and second power rails. The inverter circuit is configured to selectively output energization signals to phase windings of the motor. A DC link discharge circuit is configured to monitor a voltage level of the DC bus capacitor, and a bus switching circuit is configured to selectively output one of a first DC voltage level or a second DC voltage level to the DC voltage input terminal in response to an output of the DC link discharge circuit.

20 Claims, 5 Drawing Sheets

(58) Field of Classification Search
CPC .......... H02J 2310/48; H02J 7/345; H02J 3/32;
B64U 50/30
USPC ........................................ 244/219, 194, 221
See application file for complete search history.

(56) References Cited

U.S. PATENT DOCUMENTS

| | | | |
|---|---|---|---|
| 2012/0277942 A1* | 11/2012 | Vilar ....................... | B60L 50/10 |
| | | | 701/22 |
| 2017/0373608 A1 | 12/2017 | Neumayr et al. | |
| 2022/0200503 A1 | 6/2022 | Popek et al. | |

FOREIGN PATENT DOCUMENTS

| | | |
|---|---|---|
| CN | 211062034 U | 7/2020 |
| CN | 111703580 A | 9/2020 |
| KR | 10-1434435 B2 | 8/2014 |
| KR | 10-2022-0114930 A | 8/2022 |

OTHER PUBLICATIONS

Singh et al., "Brushless DC motor drive with power factor regulation using Landsman converter," IET Power Electronics, vol. 9, Iss. 5, pp. 900-910 (2016).
Canadian Office Action dated Apr. 3, 2025 for Application No. 3,216,384 entitled Motor Bus Switching, 4 Pages.

* cited by examiner

MOTOR BUS SWITCHING

CROSS-REFERENCE

This application claims priority to Indian Patent Application No. 202211058716, filed Oct. 14, 2022, which is incorporated by reference in its entirety.

BACKGROUND

Electric motors are in a variety of applications, such as actuators for driving or positioning various components in automobiles or aircraft. Various types of motors operate through the interaction between a magnetic field (e.g. provided by permanent magnets) and an electric current in motor windings to generate force in the form of torque applied on the motor's shaft. Several different motors may be employed for respective actuators, for example, due to physical spacing of the various applications. Even for different actuators located in close proximity to one another, such as actuators for movable aircraft wing surfaces for high lift modes and variable camber modes, respective motors may be employed due to varying torque and speed requirements for the respective wing surfaces. However, the use of multiple actuator motors may not be desirable or practical due to restrictions on space, weight, cost, etc.

SUMMARY

In accordance with some aspects of the present disclosure, a motor system includes a motor, first and second power rails connected to a DC voltage input terminal, and a DC bus capacitor connected between the first and second power rails. An inverter circuit has a first inverter leg, a second inverter leg and a third inverter leg, each of which includes first and second power switches connected in series between the first and second power rails. The inverter circuit is configured to selectively output energization signals to phase windings of the motor. A DC link discharge circuit is configured to monitor a voltage level of the DC bus capacitor, and a bus switching circuit is configured to selectively output one of a first DC voltage level or a second DC voltage level to the DC voltage input terminal in response to an output of the DC link discharge circuit.

In accordance with further aspects of disclosure, a motor operation method includes providing a motor and providing an inverter circuit configured to selectively energize phase windings of the motor. The inverter circuit includes a first inverter leg, a second inverter leg and a third inverter leg, each of which have first and second power switches connected in series between first and second power rails. A first DC voltage input is provided to the inverter circuit at a first DC voltage level. A voltage level of a DC bus capacitor connected between the first and second power rails is determined, and in response to the voltage level of the DC bus capacitor reaching a predetermined voltage level, a second DC voltage input is provided to the inverter circuit at a second DC voltage level lower than the first DC voltage level.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Electric motors are used in a variety of applications, such as actuators for driving or positioning movable surfaces of aircraft wings. Electric motors operate through the interaction between a magnetic field (e.g. provided by permanent magnets) and an electric current in motor windings to generate force in the form of torque applied on the motor's shaft. In a brushless DC (BLDC) motor, for example, DC current is provided to an inverter that receives pulse-width modulated (PWM) signals to apply the energization currents to the motor windings to achieve the desired motor operation (e.g. speed, torque, etc.).

Some aircraft wings include multiple adjustable surfaces for different flight modes. For instance, an aircraft wing may have a first adjustable surface for a high lift mode operation (e.g. take-off and landing) and a second adjustable surface for variable camber (VC) mode operation. The first adjustable wing surfaces (e.g. flaps) operated for the high lift mode may require different motor operation parameters than other adjustable surfaces used for VC mode operation. For example, high lift mode motor operation may use a high input DC voltage (e.g. 270V) and operate at speeds of over 7000 rpm with torque of 3.5 in-lbf (0.40 Nm). In contrast, the motor parameters for VC mode operation may include rotation speed of 25-30 rpm with torque of 0.8 in-lbf (0.09 Nm).

With such variation in motor operation requirements, separate actuator motors may be used for high lift mode and VC mode in some aircraft implementations. However, using separate actuator motors increases space requirements, cost, etc. Operating a single actuator motor at the varying motor parameters using only a high input DC voltage may not be satisfactory. For example, to achieve the lower speed and torque used for the VC mode, an inverter powered by a 270 VDC input voltage uses a voltage modulation index of less than 5% (i.e. only about 5.0V input to the motor terminals to achieve the speed of 500 rpm). This can result in an increase in torque ripple making it difficult to differentiate from the cogging torque of the motor.

In accordance with some aspects of the disclosure, a bus switching scheme is provided in which a single actuator motor may be used for both the high lift mode and the VC mode by switching the DC input voltage to the inverter between a high DC voltage mode and a low DC voltage mode. For example, some embodiments use the 270 VDC inverter input for the high lift mode, and a DC bus switching circuit is provided to reduce the DC input voltage to 28 VDC for the VC mode.

The inverter used for providing energization current for such actuator motor includes a DC bus capacitor, which will be discussed further below. When the DC bus switching circuit switches from the high voltage mode to the low voltage mode, the DC bus capacitor must be discharged to near the low voltage level to prevent damage to components in the system. Disclosed embodiments provide mechanisms for ensuring the DC bus capacitor has discharged to a desired level before switching operation of the actuator motor to a low voltage mode.

Figure 1:
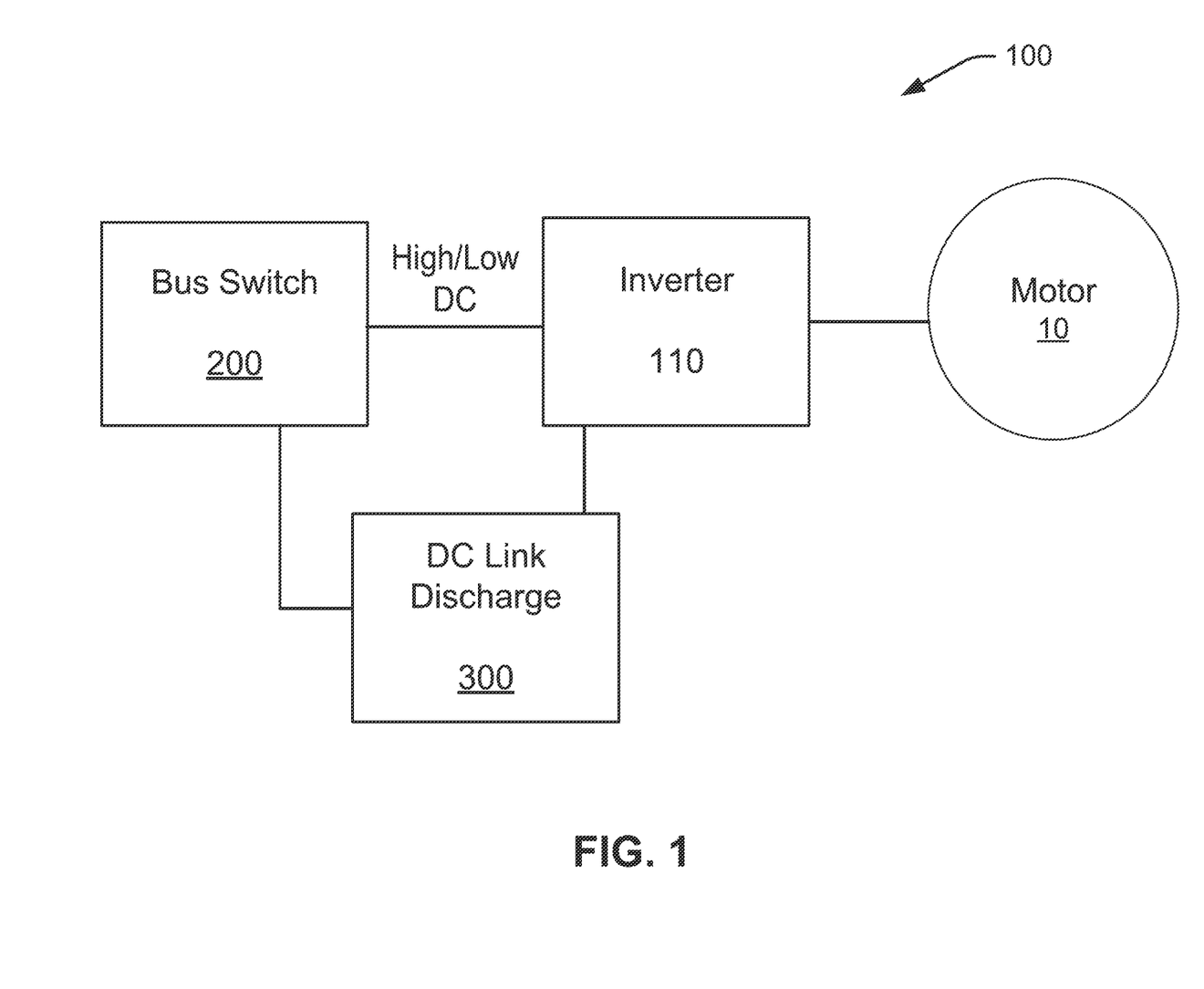
FIG. 1 is a block diagram illustrating an example of a motor system in accordance with aspects of the present disclosure.

FIG. 1 illustrates an example of a motor system 100 in accordance with the present disclosure. The motor system 100 includes an actuator motor 10, such as a three-phase BLDC motor. A power inverter 110 is configured to provide energization signals to phase windings of the motor 10 to achieve the desired motor operation. A bus switching circuit 200 provides a DC input voltage to the inverter 110. As discussed above, the bus switch circuit 200 outputs either a high DC voltage or a low DC voltage for operation in the high voltage or low voltage mode. For example, as noted above, some embodiments operate at the high voltage mode (e.g. 270 VDC) for an aircraft high lift mode (e.g. flap operation for takeoff and landing), and a low voltage mode (e.g. 28 VDC) for the VC mode operation. The system 100 further includes a DC link discharge circuit 300 that is configured to monitor discharging of a DC bus capacitor of the inverter 110, and enable a switch from one voltage mode to the other based on the DC bus capacitor reaching a predetermined voltage level.

Figure 2:
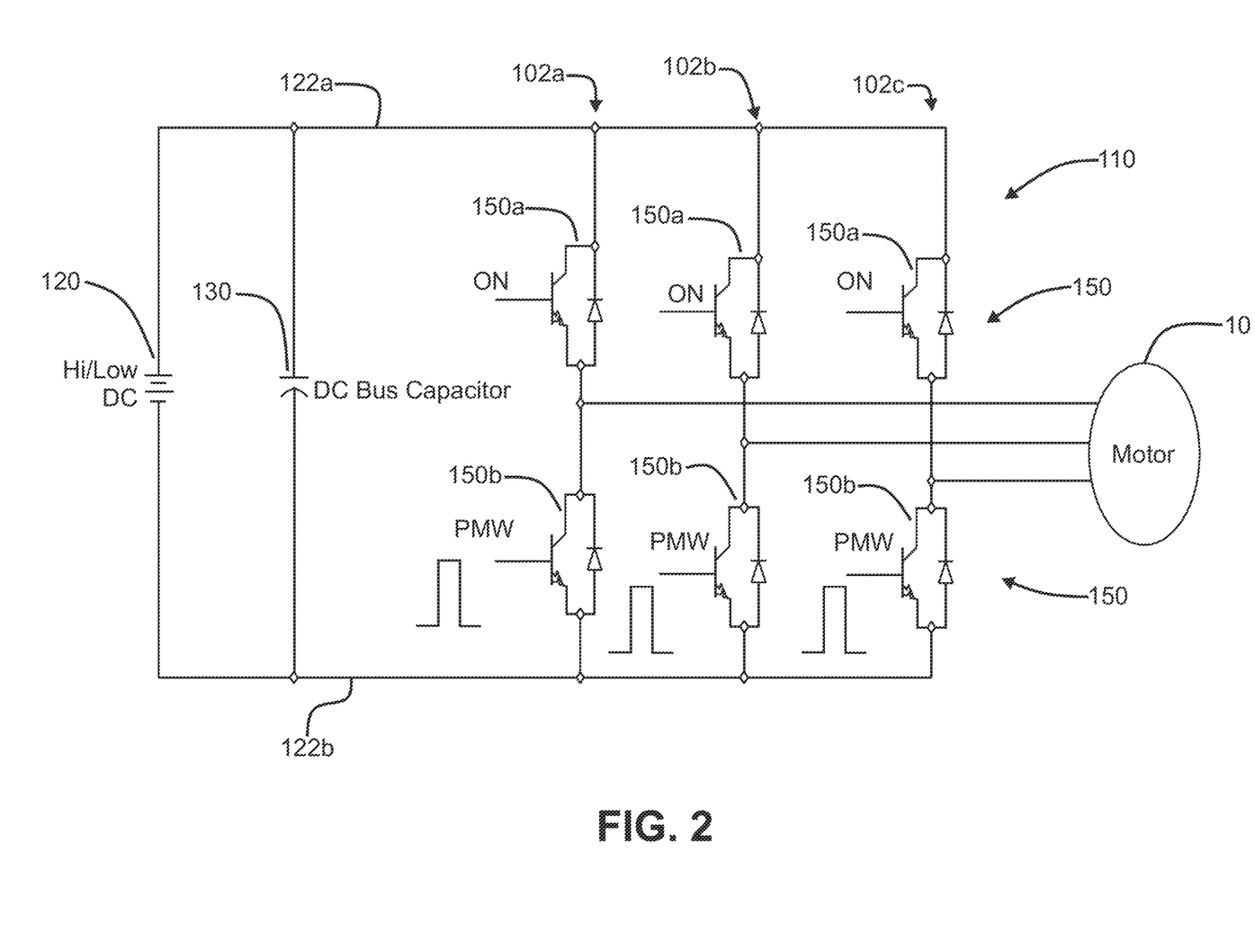
FIG. 2 is a schematic diagram illustrating an example of an inverter circuit of the motor system shown in FIG. 1.

FIG. 2 is a schematic diagram illustrating further aspects of the motor system 100. More particularly, FIG. 2 illustrates aspects of an example of the inverter 110. The inverter 110 receives a DC voltage input 120 that is provided by the bus switching circuit 200 referred to in conjunction with FIG. 1. Depending on the desired operation mode, the bus switching circuit 200 outputs a high DC voltage input 120 (e.g. 270 VDC) or a low DC voltage input 120 (e.g. 28 VDC).

The DC voltage input 120 and a DC bus capacitor 130 are each connected between upper and lower power rails 122a and 122b. The inverter 110 is configured to convert DC power from the DC voltage input 120 into AC power to generate a rotating magnetic field for the motor 10, for example. In some examples, the motor 10 may further function as a generator. In certain examples, motor speed, phase voltages, and phase currents are sensed in order to realize closed loop controls of the motor variables such as speed and torque. An encoder may provide motor position information to a motor controller, and based thereon, operation of power switches are controlled to achieve the desired operation of the motor 10.

The inverter 110 includes three branches or legs 102a, 102b and 102c (collectively inverter legs 102), each of which has two power switches 150a, 150b (collectively power switches 150) connected in series between the upper and lower power rails 102a, 102b. The switches may include, for example, bipolar transistors, IGBTs, MOSFETs, SiC, etc. in the example shown in FIG. 2, the power switches 150 are MOSFETs. To control the current and voltage applied to the motor 10, a motor controller generates PWM signals that are applied to gate terminals of the switches 150 such that the switches 150 in the motor's bridge are PWM controlled to provide the desired motor voltage and current.

Figure 3:
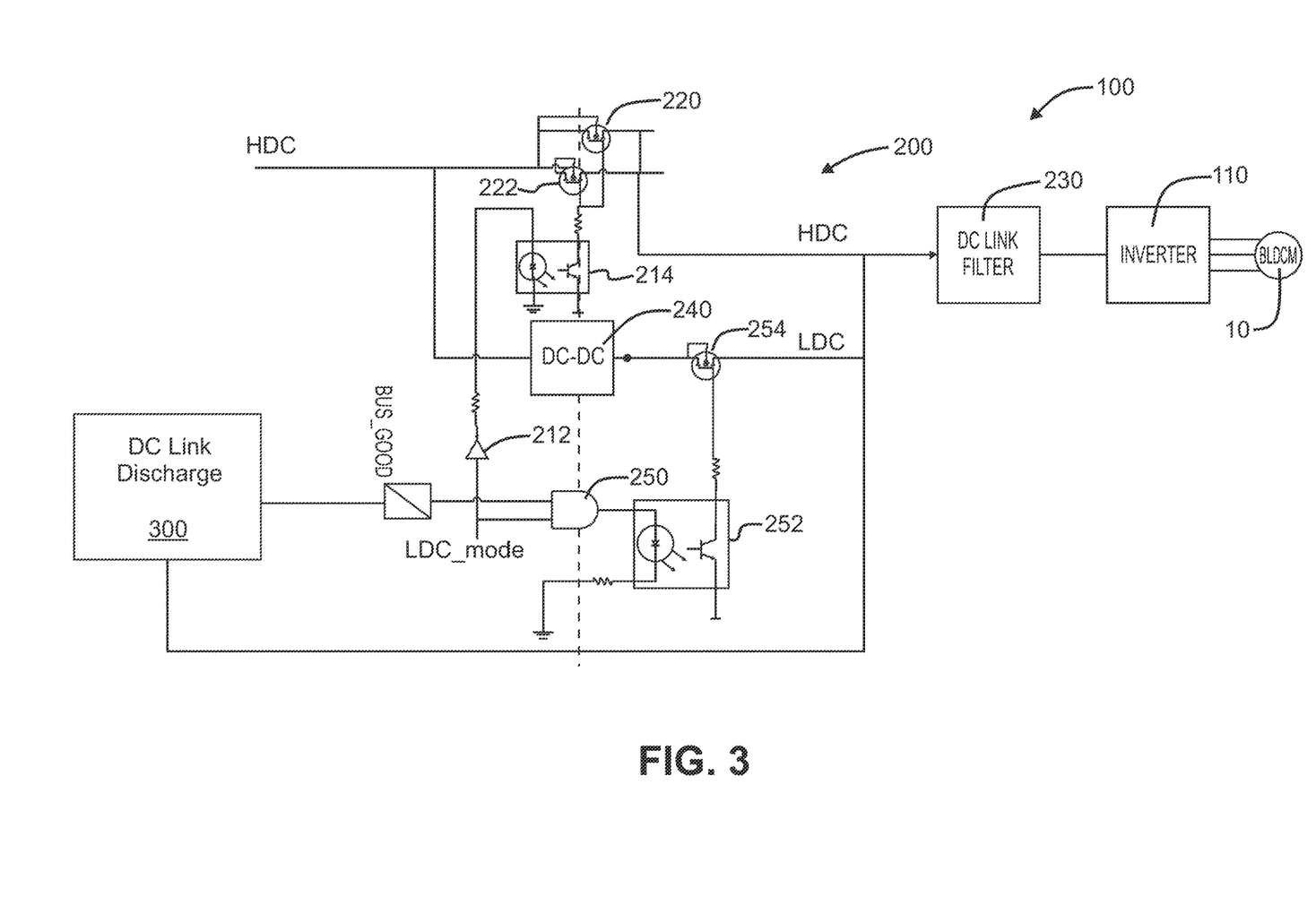
FIG. 3 is a schematic diagram illustrating an example of a bus switching circuit of the motor system of FIG. 1.

FIG. 3 is a schematic diagram illustrating further aspects of the motor system 100. FIG. 3 illustrates further aspects of the DC bus switching circuit 200. The bus switching circuit 200 receives a high DC voltage input HDC, which as noted previously is 270 VDC in some examples. The bus switching circuit 200 receives as inputs a low voltage mode command LDC_mode and a "Bus Good" (BUS_GOOD) command. The bus switching circuit 200 shown in FIG. 3 defaults to operation in the high voltage mode, such as may be used for the high lift mode. Accordingly, LDC_mode input defaults to an off state (i.e. logic low signal). The BUS_GOOD command is output by the DC link discharge circuit 300, and indicates that the DC bus capacitor 130 is at a predetermined level.

During the high voltage operation mode, the low LDC_mode signal is input to an inverter 212, the output of which is received by an isolation circuit 214. The isolation circuit 214 provides gate control signals to parallel connected p-channel MOSFET devices 220 and 222 to bias these devices on during the high voltage mode. Accordingly, the high voltage input HDC is output to a DC link filter 230 and the inverter 110 for the high DC voltage motor operation, such as for the high lift mode. The p-channel MOSFETs 220, 222 are connected in parallel to share the load current and reduce voltage drop during the high voltage mode. In some implementations, the isolation circuit 214 employs an optocoupler.

When the LDC_mode signal goes high to indicate the low voltage mode, the isolation circuit 214 outputs gate control signals to the MOSFETs 220, 222 to turn these devices off. This disconnects the DC link filter 230 and inverter 110 from the high voltage input HDC. The high voltage input HDC is additionally received by a DC-DC converter 240, which is configured to convert the high level DC voltage HDC to the low level DC voltage LDC. In the example discussed herein, the DC-DC converter 240 is configured to convert the 270 VDC voltage use for the high voltage mode to 28 VDC for the low voltage mode. An Eaton QB150 DC-DC converter is an example of a suitable DC-DC converter.

The LDC_mode signal is further received by an AND gate 250. The AND gate 250 also receives as an input the BUS_GOOD signal from the DC link discharge circuit 300. When the DC link discharge circuit 300 determines that the DC bus capacitor voltage has discharged to a predetermined level, the BUS_GOOD signal goes high, resulting in a high output by the AND gate 250. The output of the end gate 250 is received by an isolation circuit 252, which provides a gate control signal to a MOSFET 254. In some implementations, the isolation circuit 252 employs an optocoupler. The high output from the AND gate 250, which indicates the low voltage mode selection as well as the high BUS_GOOD signal (i.e. DC bus capacitor has discharged to the predetermined level), turns on the MOSFET 254 to provide the low voltage DC signal from the DC-DC converter 240 to the DC link filter 230 and the inverter 110 to operate the inverter 110 in the low voltage mode.

Figure 4:
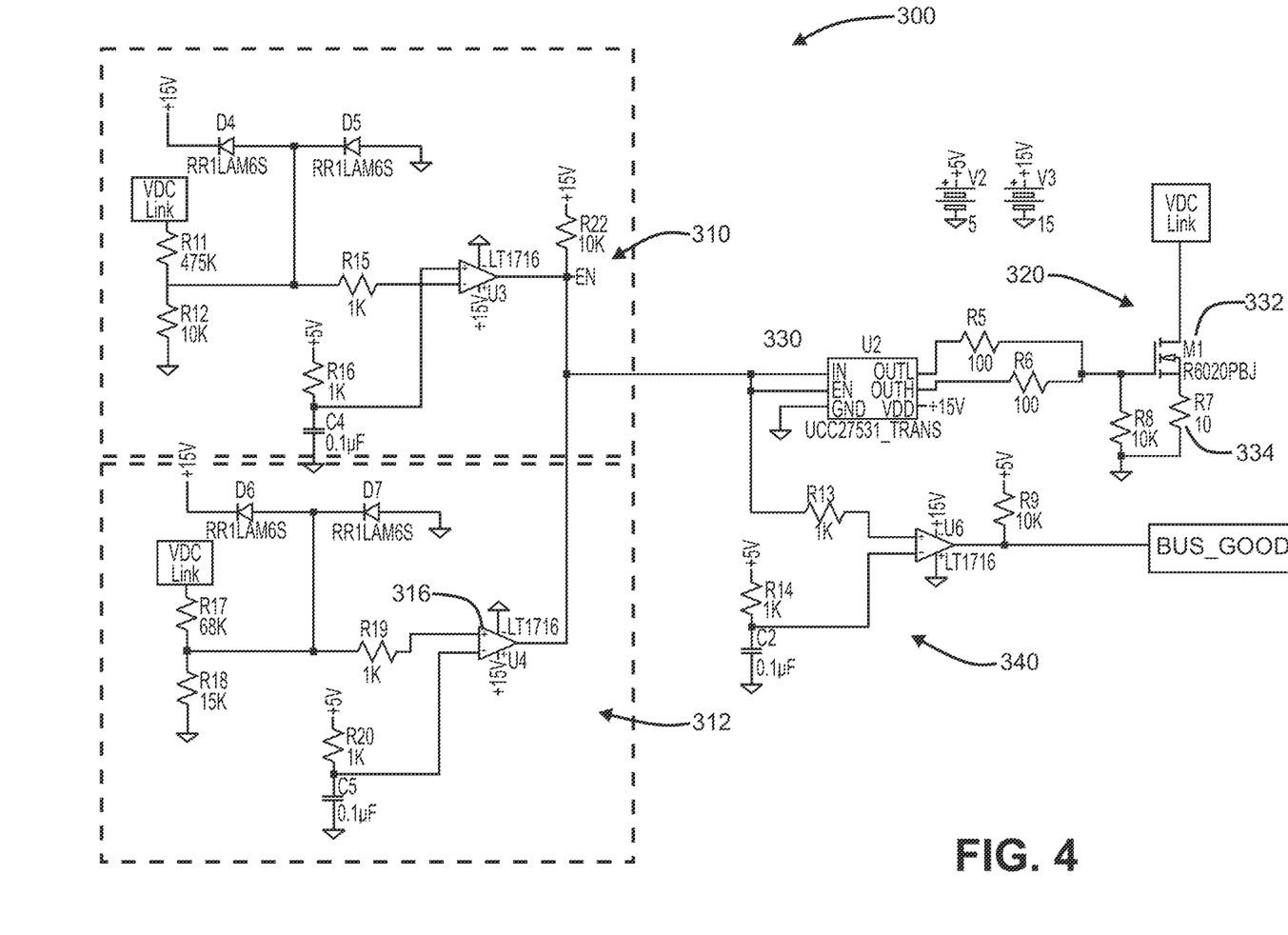
FIG. 4 is a schematic diagram illustrating an example of a DC link discharge circuit of the motor system of FIG. 1.

FIG. 4 illustrates an example of the DC link discharge circuit 300. The DC link voltage ("VDC Link" i.e. voltage level of the DC bus capacitor 130) is input to first and second comparator circuits 310, 312, as well as a dissipation circuit 320. The VDC link voltage signal is received by respective voltage dividers of the first and second comparator circuits 310, 312, the output of which is input to respective comparator devices 314, 316. The comparator circuits 310, 312 are configured to determine when the VDC link voltage has discharged to a level between predetermined upper and lower limit voltages. For example, in some embodiments the first comparator circuit 310 is configured to provide a high output upon the VDC link voltage falling from the 270 VDC high voltage input level to 240 VDC. The second comparator circuit 312 is configured in some embodiments to provide a high output upon the VDC link voltage reaching 28 VDC.

The output of the comparator circuits 310, 312 is provided to a MOSFET driver chip 330, which is a UCC27531 chip in some examples. The driver chip 330 outputs a gate control signal to a MOSFET 332. Thus, when the VDC link voltage has discharge to a level between first and second predetermined voltage levels (e.g. 240 VDC and 28 VDC), the driver chip 330 turns on the MOSFET 332 to more rapidly discharge the VDC link voltage through the MOSFET 332 and a resistor 334, for example.

An output circuit 340 also receives the output of the first and second comparator circuit 310, 312, and in response to the VDC link voltage falling to the second predetermined voltage level (e.g. 28 VDC), the BUS_GOOD signal goes high.

Thus, before operating the inverter at the low voltage level LDC, the DC link discharge circuit first determines that the DC bus capacitor 130 has discharge to the second predetermined level.

Figure 5:
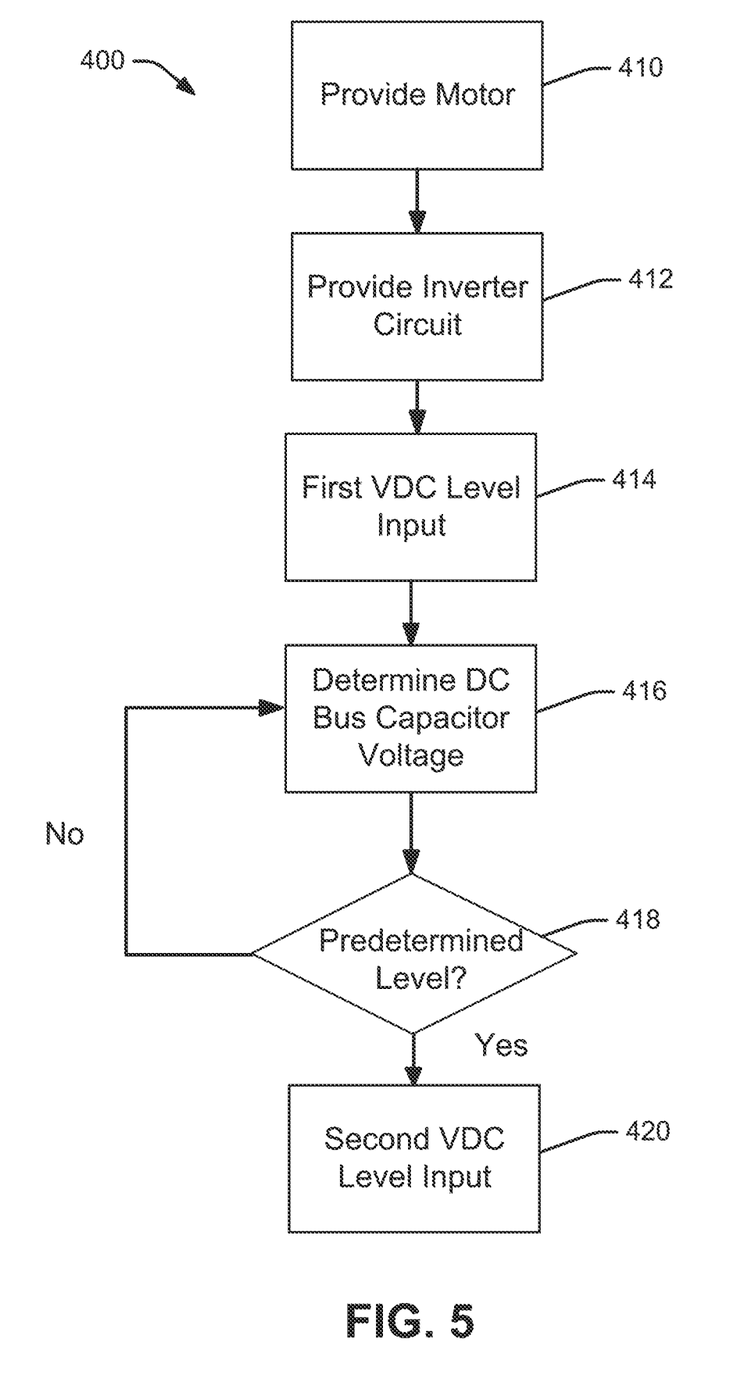
FIG. 5 is a flow diagram illustrating a motor operation method in accordance with aspects of the present disclosure.

FIG. 5 illustrates a method 400 in accordance with aspects of the disclosure. More specifically, the method 400 illustrated in FIG. 5 generally expresses aspects of the devices discussed above in terms of a method for operating the devices. For instance, in an operation 410, a motor is provided, such as the three phase BLDC 10. As noted above, the example three phase BLDC motor has first, second and third phase windings. In operation 412, an inverter circuit is provided, such as the inverter circuit 110 discussed above. Examples of the inverter circuit 110 are configured to selectively energize the phase windings of the motor, and include a first inverter leg, a second inverter leg and a third inverter leg. The first, second and third inverter legs each have first and second power switches connected in series between first and second power rails. In operation 414, a first DC voltage input is provided to the inverter circuit such that the inverter second receives a first DC voltage level. The first DC voltage level may be the high DC voltage level HDC discussed above, used for a high voltage mode (e.g. 270 VDC) for an aircraft high lift mode. At operation 416, the voltage level of the DC bus capacitor connected between the first and second power rails is determined. As noted above, the disclosed DC link discharge circuit 300 is configured for this purpose in some examples. If it is determined in decision block 418 that the DC bus capacitor has reached a predetermined voltage level, a second DC voltage input is provided to the inverter circuit such that the inverter circuit is powered at a DC voltage level lower than the first DC voltage level in operation 420. In the examples discussed above, the second the DC voltage level corresponds to the low voltage level LDC used for a VC mode operation. If the DC bus capacitor has not reached the predetermined voltage level as determined in operation 418, monitoring of the DC bus capacitor voltage continues at operation 416.

The foregoing outlines features of example embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A motor system, comprising:
a motor;
first and second power rails connected to a DC voltage input terminal;
a DC bus capacitor connected between the first and second power rails;
an inverter circuit including a first inverter leg, a second inverter leg and a third inverter leg, each of the first, second and third inverter legs including first and second power switches connected in series between the first and second power rails, the inverter circuit configured to selectively output energization signals to phase windings of the motor;
a DC link discharge circuit configured to monitor a voltage level of the DC bus capacitor; and
a bus switching circuit configured to selectively output one of a first DC voltage level or a second DC voltage level to the DC voltage input terminal in response to an output of the DC link discharge circuit.

2. The system of claim 1, wherein the first DC voltage level is a high DC voltage level and wherein the second DC voltage level is a low DC voltage level that is lower than the high DC voltage level.

3. The system of claim 1, wherein the bus switching circuit is configured to selectively output the one of the first DC voltage level or the second DC voltage level in response to the DC link discharge circuit determining that the voltage level of the DC bus capacitor has discharged to a first predetermined level.

4. The system of claim 3, wherein the bus switching circuit is configured to selectively output the one of the first DC voltage level or the second DC voltage level in response to the DC link discharge circuit determining that the voltage level of the DC bus capacitor has discharged to a level between the first predetermined level and a second predetermined level.

5. The system of claim 4, wherein the second predetermined level is a low DC voltage level.

6. The system of claim 4, wherein the first predetermined level is a high DC voltage level.

7. The system of claim 4, wherein the first predetermined level is configured for an aircraft high lift mode.

8. The system of claim 4, wherein the second predetermined level is configured for an aircraft variable camber mode.

9. The system of claim 1, wherein the DC link discharge circuit includes:
a first comparator circuit configured to compare the voltage level of the DC bus capacitor to a third DC voltage level lower than the first DC voltage level and higher than the second DC voltage level; and
a second comparator circuit configured to compare the voltage level of the DC bus capacitor to the second DC voltage level.

10. The system of claim 9, wherein the DC link discharge circuit includes:
a dissipation circuit configured to selectively connect the DC bus capacitor to a discharge path in response to the first and second comparator circuits.

11. A method, comprising:
providing a motor;
providing an inverter circuit configured to selectively energize phase windings of the motor, the inverter circuit including a first inverter leg, a second inverter leg and a third inverter leg, each of the first, second and third inverter legs including first and second power switches connected in series between first and second power rails;
providing a first DC voltage input to the inverter circuit at a first DC voltage level;
determining a voltage level of a DC bus capacitor connected between the first and second power rails; and
in response to the determined voltage level of the DC bus capacitor reaching a predetermined voltage level, providing a second DC voltage input to the inverter circuit at a second DC voltage level lower than the first DC voltage level.

12. The method of claim 11, wherein the first DC voltage is input to the inverter circuit for an aircraft high lift mode.

13. The method of claim 11, wherein the second DC voltage is input to the inverter circuit for an aircraft variable camber mode.

14. The method of claim 11, further comprising:
comparing the voltage level of the DC bus capacitor to a third DC voltage level lower than the first DC voltage level and higher than the second DC voltage level;
comparing the voltage level of the DC bus capacitor to the second DC voltage level; and
providing the second DC voltage input to the inverter circuit in response to the voltage level of the DC bus capacitor being between the third DC voltage level and the second DC voltage level.

15. The method of claim 14, further comprising:
selectively connecting the DC bus capacitor to a discharge path in response to the to the voltage level of the DC bus capacitor being less than the third DC voltage level.

16. A motor control system, comprising:
an inverter circuit including a first inverter leg, a second inverter leg and a third inverter leg, each of the first, second and third inverter legs including first and second power switches connected in series between first and second power rails, the inverter circuit configured to selectively output energization signals to phase windings of a motor;
a DC link discharge circuit configured to monitor a voltage level of a DC bus capacitor connected between the first and second power rails; and
a bus switching circuit configured to selectively output one of a first DC voltage level or a second DC voltage level to the inverter circuit in response to an output of the DC link discharge circuit.

17. The system of claim 16, wherein the first DC voltage level is a high DC voltage level and wherein the second DC voltage level is a low DC voltage level that is lower than the high DC voltage level.

18. The system of claim 16, wherein the bus switching circuit is configured to selectively output the one of the first DC voltage level or the second DC voltage level in response to the DC link discharge circuit determining that the voltage level of the DC bus capacitor has discharged to a first predetermined level.

19. The system of claim 18, wherein the bus switching circuit is configured to selectively output the one of the first DC voltage level or the second DC voltage level in response to the DC link discharge circuit determining that the voltage level of the DC bus capacitor has discharged to a level between the first predetermined level and a second predetermined level.

20. The system of claim 19, wherein the second predetermined level is a low DC voltage level.

* * * * *